Nov. 20, 1928.  
H. E. STURTEVANT  
1,692,799  
POWER TRANSMISSION CHAIN  
Filed June 20, 1925  2 Sheets-Sheet 1
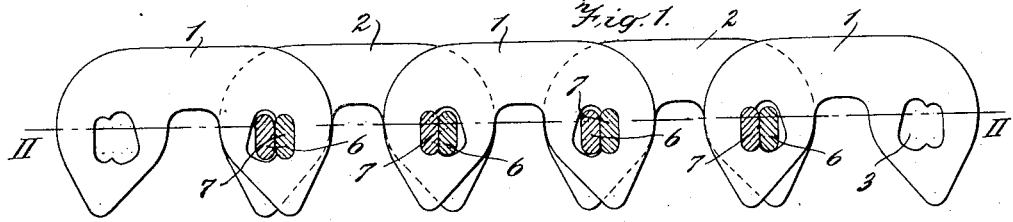
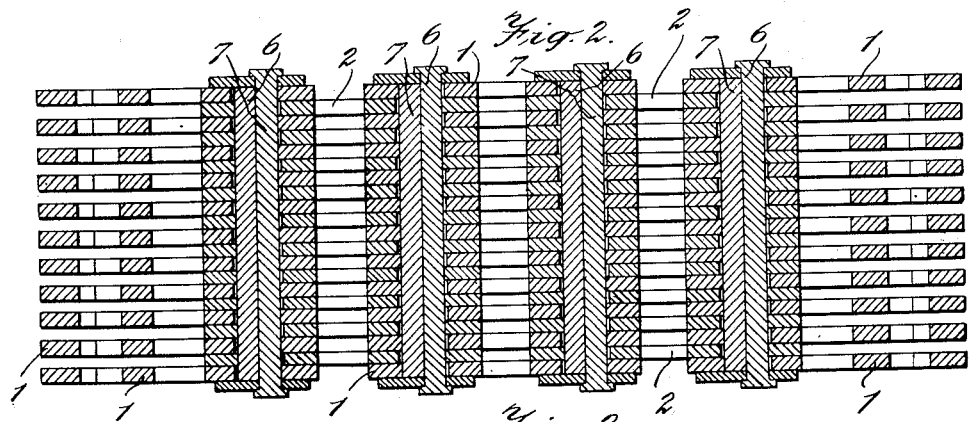
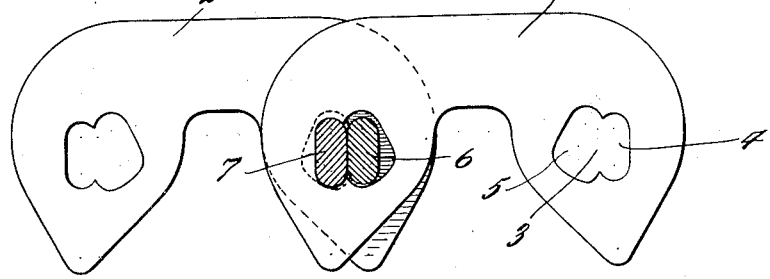
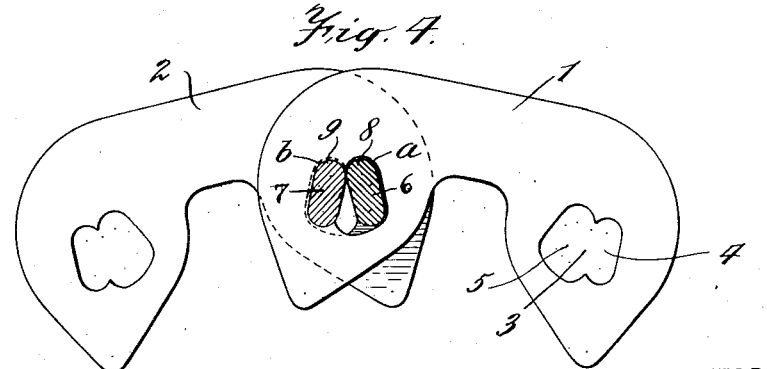
INVENTOR.  
Harold E. Sturtevant  
BY Gifford & Scull  
ATTORNEY.

Nov. 20, 1928.                                            1,692,799
H. E. STURTEVANT
POWER TRANSMISSION CHAIN
Filed June 20, 1925        2 Sheets-Sheet 2

INVENTOR.
Harold E. Sturtevant
BY
Gifford & Scull
his ATTORNEYS

Patented Nov. 20, 1928.

1,692,799

UNITED STATES PATENT OFFICE.

HAROLD E. STURTEVANT, OF HARTFORD, CONNECTICUT, ASSIGNOR TO THE WHITNEY MFG. CO., OF HARTFORD, CONNECTICUT, A CORPORATION OF CONNECTICUT.

POWER-TRANSMISSION CHAIN.

Application filed June 20, 1925. Serial No 38,397.

My invention relates to link chains, and particularly to such chains of the silent type.

My invention will be better understood by reading the following description taken in connection with the accompanying scale drawings, showing one embodiment thereof, and in which, Fig. 1 is a side view of a portion of a chain embodying my invention;

Fig. 2 is an inverted sectional view taken on the plane of line II—II of Fig. 1;

Fig. 3 is a sectional elevation on a larger scale than the preceding figures illustrating the positions assumed by the links of adjacent pitches and the pin parts passing through the openings in the links in the straight run of the chain;

Fig. 4 is a view similar to Fig. 3, illustrating the position of the parts when the joint shown in Fig. 3 is flexed;

Figure 5:
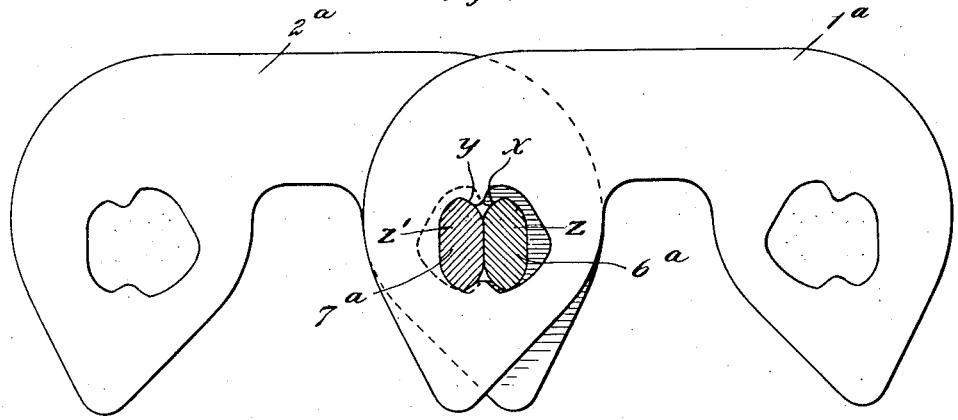
Fig. 5 shows a modification of my invention with the parts in position assumed in the straight run of the chain.

Referring to the drawings, the chain comprises a plurality of links 1 arranged side by side and a plurality of links 2 arranged side by side and overlapping links 1. Each link is provided at each end with an opening 3 having a form illustrated in Figs. 1, 3 and 4. Part 4 of each opening 3 nearest the end of each link is of a size to snugly fit one of the parts of the pintle, while the other part 5 of each opening is larger than the pintle part so as to permit free flexing of the chain joints.

Each pintle is composed of two parts 6 and 7, preferably identical as to size and shape. Each of these pintle parts has flat parallel sides and rounded edges, preferably circular, and they are arranged in the links so that each parts is held by one set of links and moves therewith. For instance, in Fig. 1 the part 7 is carried by the links 1 and moves therewith, whereas the part 6 is carried by the links 2 and moves therewith.

In the straight run of the chain, as shown in Figs. 1 and 3, the flat sides of the parts 6 and 7 contact and form a large area of contact to carry the load. By providing this increased area of contact during the straight run of the chain, the elongation of the chain due to wear of the parts, is greatly decreased so that the chain holds its original pitch for a much longer period than usual.

When the chain flexes the parts assume the position shown in Fig. 4. During the flexing of the joint the upper circular edges 8 and 9 are in contact. The pintle parts move from the positions shown in Fig. 3 to those shown in Fig. 4 by a rolling contact between the rounded or circular upper edges of the pintle parts.

It will be noted that the lower edges of the pintle parts are also circular and in fact are preferably identical with the upper edges, so that the pintle parts are reversible. In the embodiment shown, the two pintle parts 6 and 7 are identical as to shape and size, so that these parts are interchangeable. The advantages of these reversible and interchangeable features are that in assembling the chain by automatic machinery it is immaterial how the individual pintle parts are inserted in the joint. That is to say, either edge may be inserted as the initial rocking surface. Likewise the pintle parts may be interchanged without in any way affecting the operation of the chain. After the chain has been assembled and operated for a period of time, the rocking surfaces usually wear somewhat and permit the chain to increase in length. In a chain of the construction shown, the pintle parts may be reversed so as to bring the areas $a$ and $b$, Fig. 4, into contact. After these parts become worn the corresponding portions on the lower edges of these parts may be brought into cooperative contact, so that with the arrangement shown there are four sets of cooperative contacting areas with each pair of pintle parts. This greatly prolongs the life of the pintle parts and thereby increases the life of the chain.

It is usually desirable to place the pintle parts 6 and 7 at a very slight angle to the vertical (about 1°) so as to slightly separate the lower portions of the contacting faces on the straight run of the chain. This angle is so small that upon slight wearing of the contacting faces a relatively large contact area is established between the pintle parts, so that the lengthening of the chain due to wear is not very great, nothing like as great in fact as would be the case if two round pins were substituted for the parts 6 and 7. This slight clearance also allows the chain to sag between sprockets in the usual way. This angle is so small that it does not show in the drawings.

Figure 6:
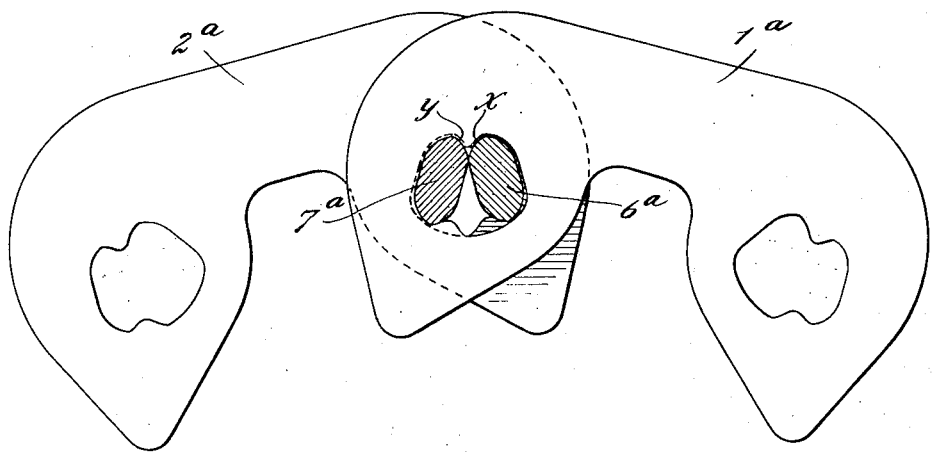
Fig. 6 shows the position of the parts of the device of Fig. 5 when the joint is flexed.

In the modification shown in Figs. 5 and 6, the parts similar to those shown in the preceding figures bear the same numerals with the exponent "a" added. The only difference between the structure shown in these figures and that shown in Figs. 1 to 4 is that the edges of the pintle parts $6^a$ and $7^a$ instead of being round are of a composite nature. The portion X of the part $6^a$ is an arc of a circle whose center is to the right of the vertical center of the pintle part and below the center line of the chain. The center of the circle X is approximately at the point Z, Fig. 5. The surface Y on the part $7^a$ is formed similarly to the part X, that is to say, it is an arc of a circle with its center at approximately the point Z'. By arranging these areas as above explained, the pitch of the chain is slightly lengthened as the joint flexes so as to slightly ease up the joint as it goes around the sprocket. This action is believed to contribute somewhat to the quietness of the chain.

The other corresponding portions of the pintle parts are formed in the same manner as explained in connection with the parts X and Y, so that the pintles may be interchanged with each other or reversed in position in the same manner as explained in connection with the parts 6 and 7 of Figs. 1 to 4.

In a chain of the structure shown, the pintle parts may be, and usually are, made from hardened steel stock, and therefore have good wearing qualities, whereas the links are usually made of softer material, which is tough and durable.

Slight changes may be made in the construction of the parts without departing from the spirit of my invention.

I claim:

1. A chain of the silent link type having a plurality of link elements constituting a chain link, sprocket engaging teeth on the ends of said link elements, joints between the link elements, separate and removable two-part pintles passing through the link elements at the joints and held out of contact with the sprocket teeth by the link elements, said pintle parts being symmetrical, one fixed with each set of links, said parts having flat sides cooperating on the straight run of the chain and rounded upper edges coacting when the joint flexes.

2. A chain of the silent link type having joints between the pitches, two-part pintles passing through the links at the joints, said pintle parts being symmetrical and one fixed with each set of links, each having flat parallel sides and rounded edges, the said parts being reversible and interchangeable.

HAROLD E. STURTEVANT.